Figure 1:
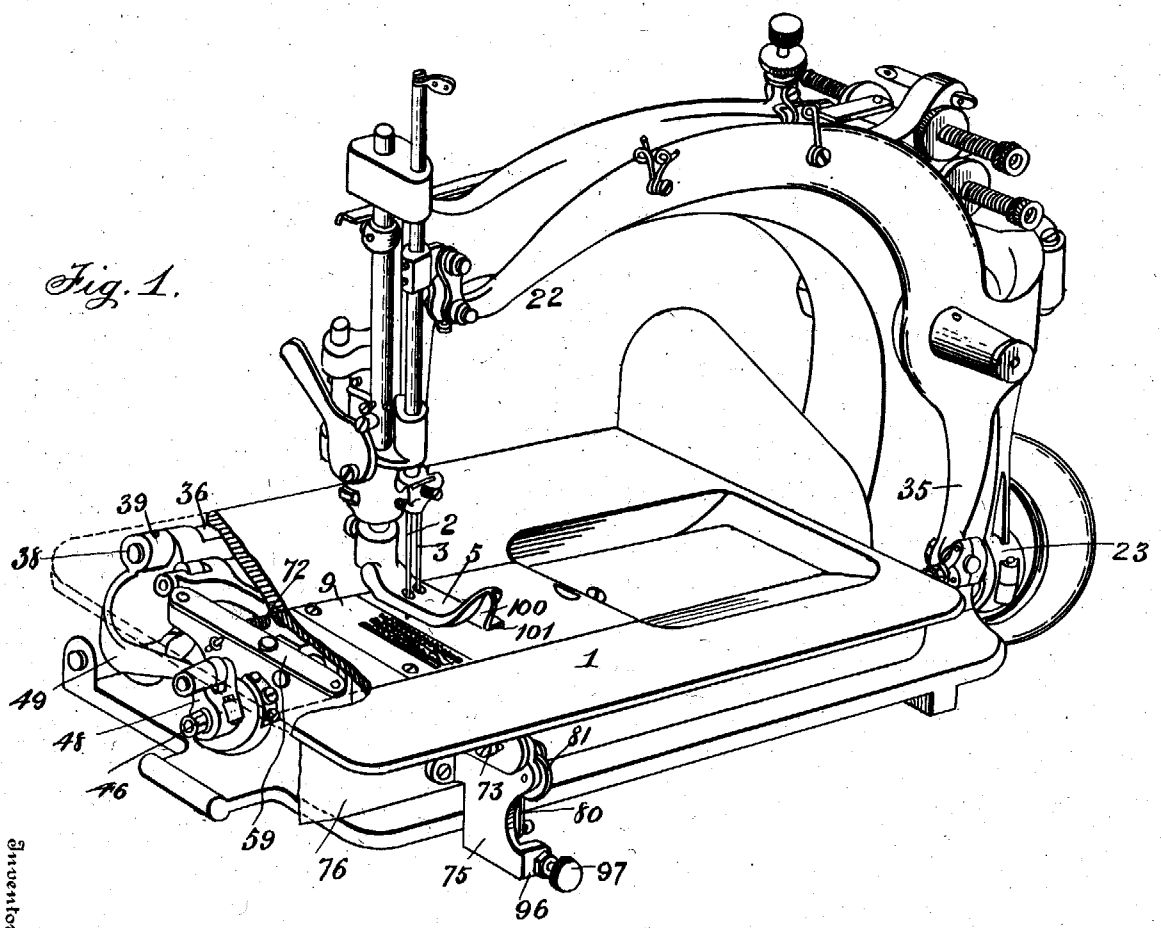

B. H. ZIMMERMAN & R. HUGHES, Jr.

SEWING AND TRIMMING MACHINE.

APPLICATION FILED FEB. 13, 1907.

Reissued Dec. 6, 1910.

13,182.

6 SHEETS—SHEET 1.

Witnesses

F. L. Ourand.

Albert G. Davis

Inventors

Bernard H. Zimmerman

Robert Hughes Jr.

By Stuntevant & Mason

Attorneys

B. H. ZIMMERMAN & R. HUGHES, Jr.
SEWING AND TRIMMING MACHINE.
APPLICATION FILED FEB. 13, 1907.
Reissued Dec. 6, 1910.
13,182.
6 SHEETS—SHEET 2.
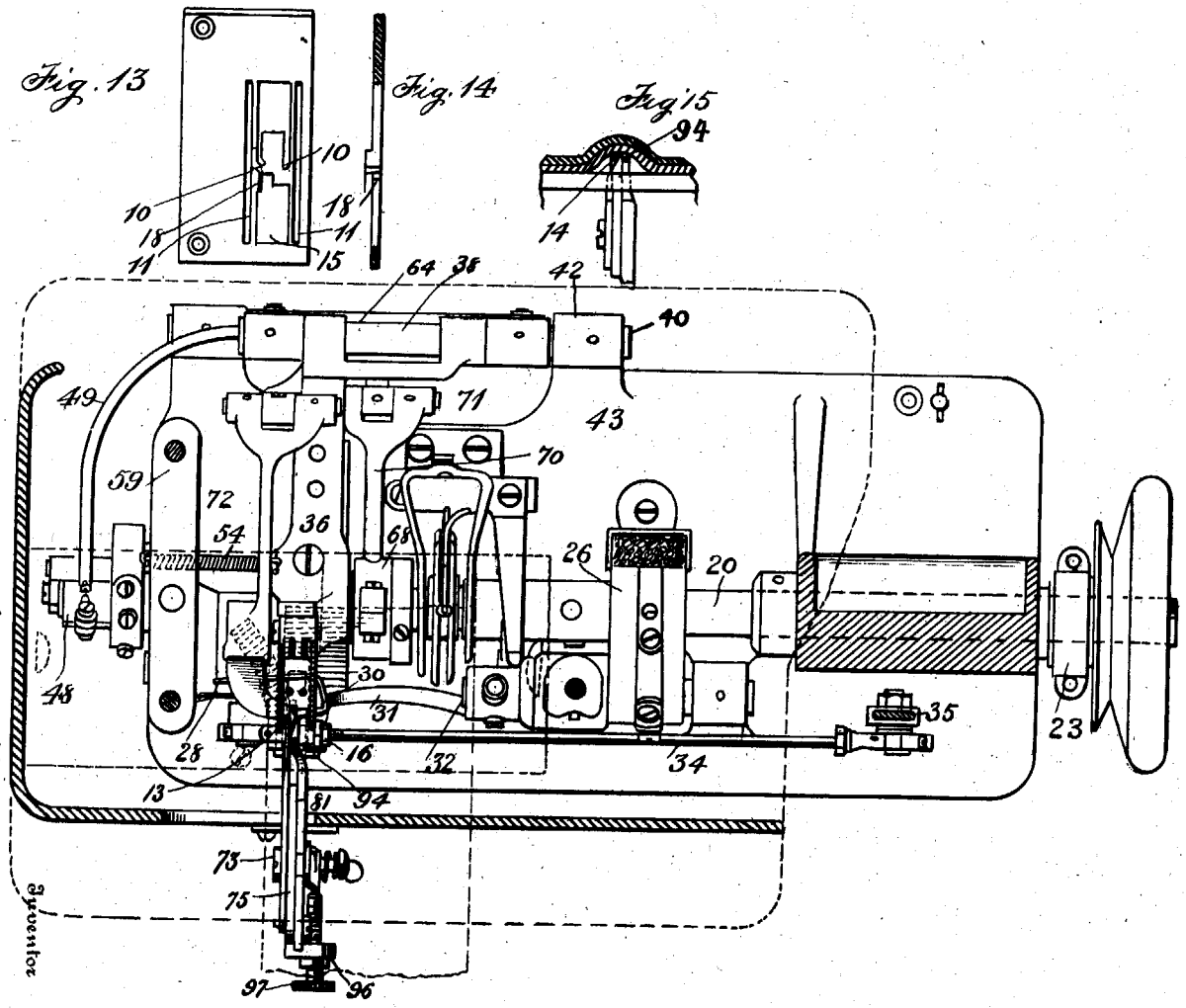
Witnesses
F. L. Durand.
Albert Perkins
Inventor
Bernard H. Zimmerman
Robert Hughes Jr.
By
Sturtevant & Mason
Attorneys B. H. ZIMMERMAN & R. HUGHES, Jr.
SEWING AND TRIMMING MACHINE.
APPLICATION FILED FEB. 13, 1907.
Reissued Dec. 6, 1910.
13,182.
6 SHEETS—SHEET 3.
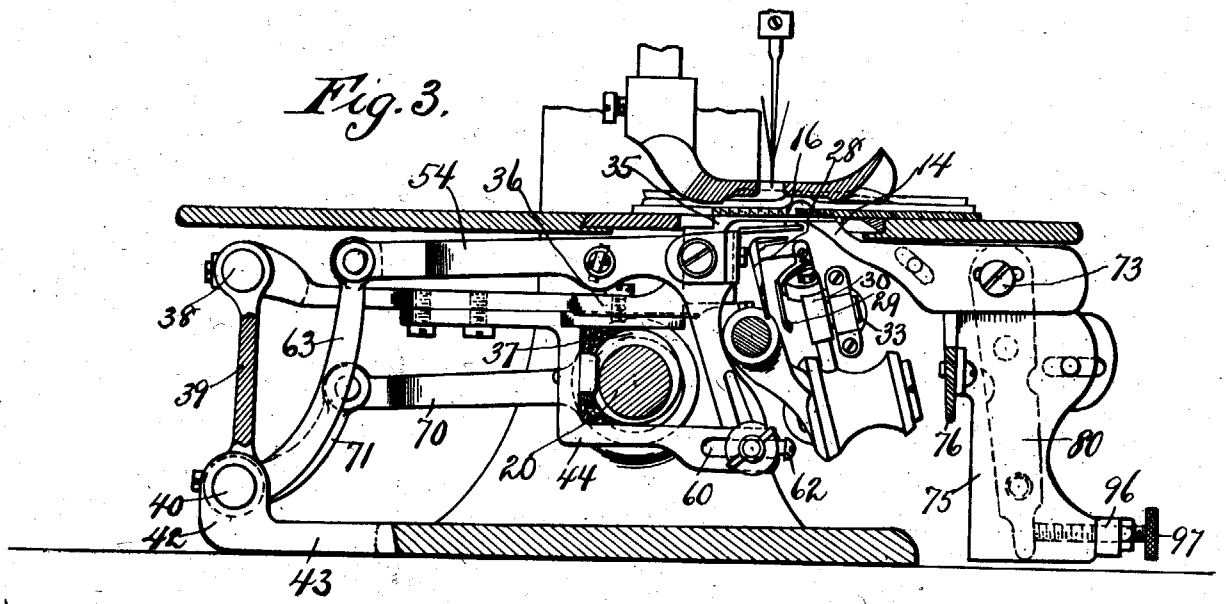
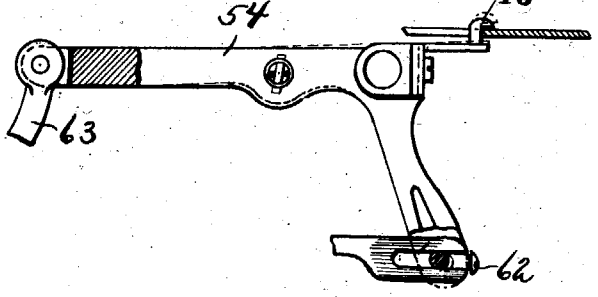
Witnesses
Albert Popkins
Franck L. Durand
By
Inventors
Bernard H. Zimmerman
Robert Hughes Jr.
Sturtevant & Mason
Attorneys B. H. ZIMMERMAN & R. HUGHES, JR.
SEWING AND TRIMMING MACHINE.
APPLICATION FILED FEB. 13, 1907.
Reissued Dec. 6, 1910.
13,182.
6 SHEETS—SHEET 4.
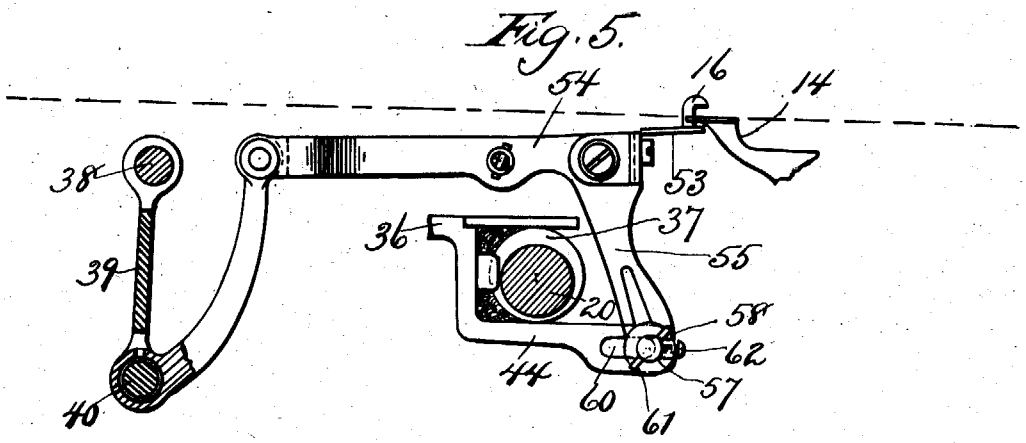
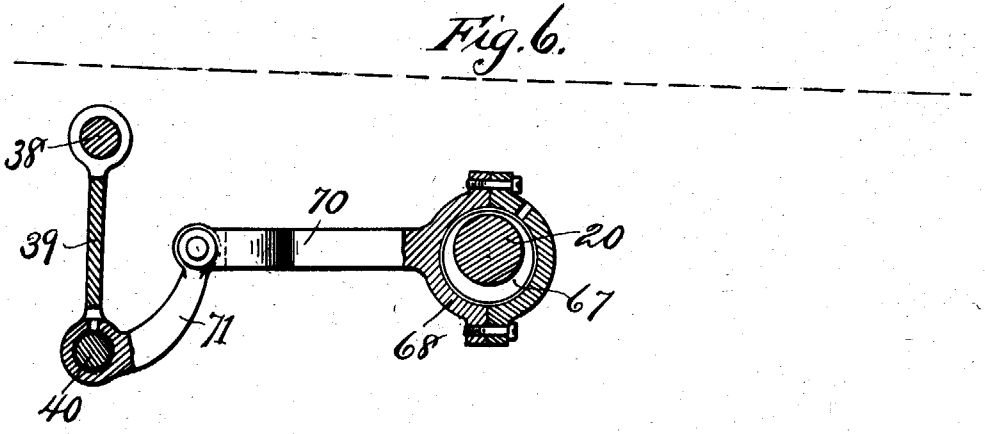
Witnesses
Albert Popkins
Franck L. Durand
Inventor
Bernard H. Zimmerman
Robert Hughes Jr.
By
Stuntevant & Mason
Attorneys B. H. ZIMMERMAN & R. HUGHES, Jr.

SEWING AND TRIMMING MACHINE.

APPLICATION FILED FEB. 13, 1907.

Reissued Dec. 6, 1910.

13,182.

6 SHEETS—SHEET 5.

Witnesses

Albert Popkins

Franck L. Durand

Inventors

Bernard H. Zimmerman

Robert Hughes Jr.

By

Sturtevant & Mason

Attorneys

B. H. ZIMMERMAN & R. HUGHES, Jr.

SEWING AND TRIMMING MACHINE.

APPLICATION FILED FEB. 13, 1907.

Reissued Dec. 6, 1910.

13,182.

6 SHEETS—SHEET 6.

Witnesses

Albert Popkins.

Franck L. Durand

Inventors

Bernard H. Zimmerman

By Robert Hughes Jr.

Sturtevant & Mason

Attorneys

UNITED STATES PATENT OFFICE.

BERNARD H. ZIMMERMAN, OF STITTVILLE, AND ROBERT HUGHES, JR., OF UTICA, NEW YORK, ASSIGNORS, BY MESNE ASSIGNMENTS, TO UNION SPECIAL MACHINE COMPANY, OF CHICAGO, ILLINOIS, A CORPORATION OF ILLINOIS.

SEWING AND TRIMMING MACHINE.

13,182. Specification of Reissued Letters Patent. Reissued Dec. 6, 1910.

Original No. 804,364, dated November 14, 1905, Serial No. 242,120. Application for reissue filed February 13, 1907. Serial No. 357,137.

*To all whom it may concern:*

Be it known that we, BERNARD H. ZIMMERMAN, formerly a resident of Scranton, in the county of Lackawanna and State of Pennsylvania, now residing at Stittville, Oneida county, New York, and ROBERT HUGHES, Jr., a resident of Utica, in the county of Oneida and State of New York, citizens of the United States of America, have invented certain new and useful Improvements in Sewing and Trimming Machines, of which the following is a specification.

Our invention relates to certain new and useful improvements in that class of sewing machines described and illustrated in our patent granted May 23rd, 1905, No. 790,473, in which a pair of knives or cutting mechanism is combined with stitching mechanism in such a manner that the material to be sewed is cut and overstitched at one operation through the machine.

The particular purpose for which this machine is adapted is what is known as "necking" underwear, and to perform this work it is necessary that the machine be capable of feeding a plurality of layers of fabric, separating said layers, trimming or cutting one of the layers prior to the stitching operation, guiding or deflecting one of the cut edges so that it will not be stitched, and finally overstitching the undeflected cut edge to the layer or layers that have not been cut.

As just stated, this machine is particularly adapted for necking of underwear; but it is evident that it may be used for a number of other purposes—such, for example, as cutting or cutting and stitching the hems of any class of work, cutting and stitching collarettes, &c.

The objects of our invention are to improve the machine shown in our application before mentioned; to provide means for yieldingly holding one of the knives in contact with the other; to provide a device for making the cutting device ineffective, and to provide means to permit the ready adjustment of the parts in order that the material of different thicknesses may be trimmed.

With the aforesaid objects especially in mind, our invention consists in a sewing machine having its parts constructed and arranged to perform the aforesaid objects, and this machine is shown, in the embodiment in which we now prefer to make it, in the accompanying drawings, and it will be hereinafter more particularly described and then definitely claimed at the end hereof.

Figure 7:
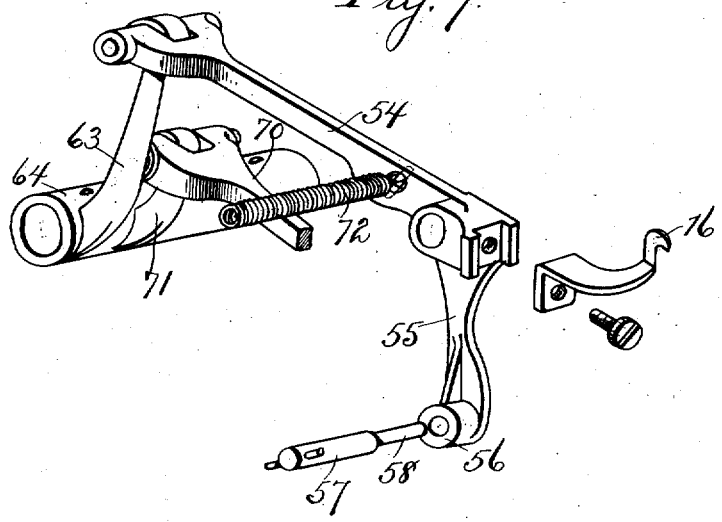
Figure 8:
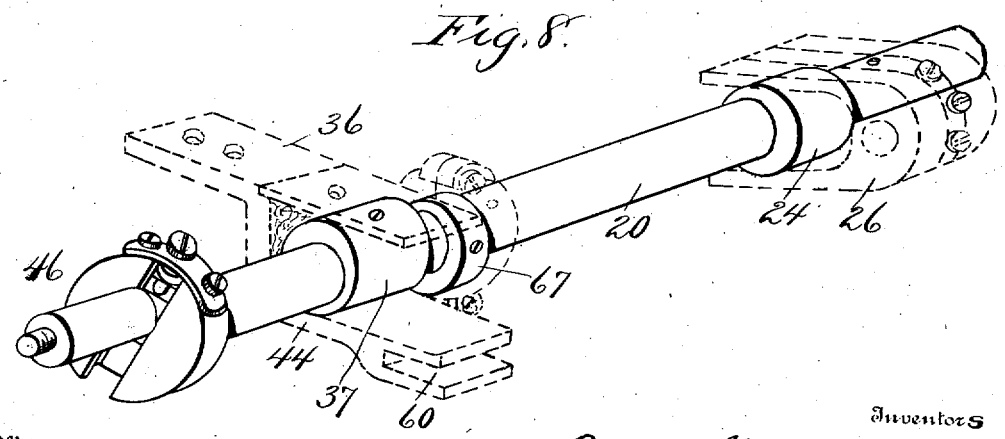
Figure 9:
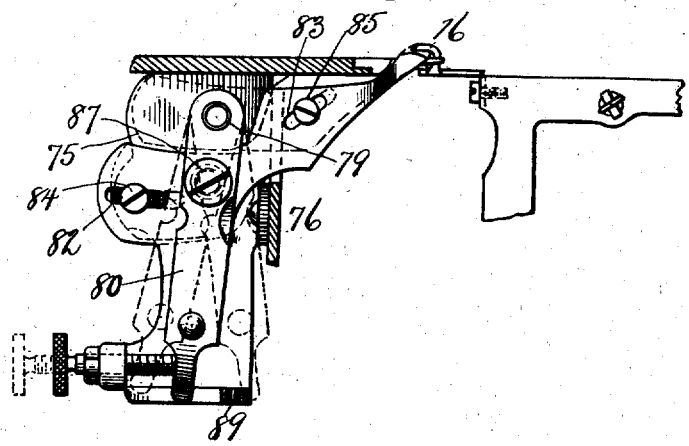
Figure 10:
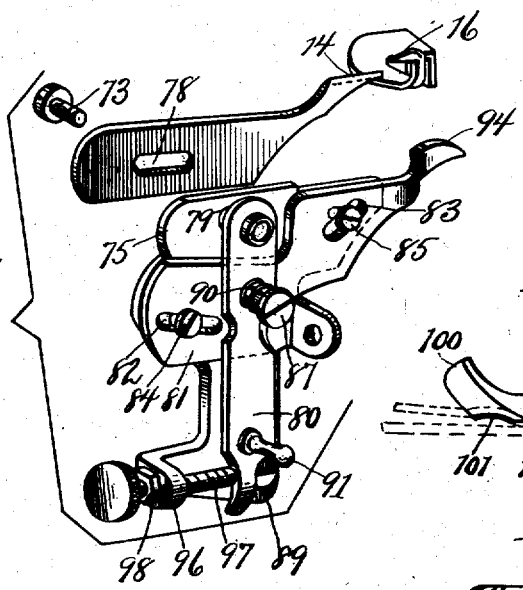
Figure 11:
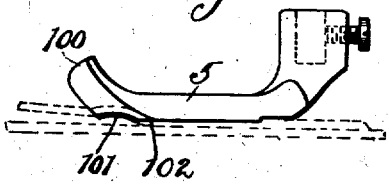
Figure 12:
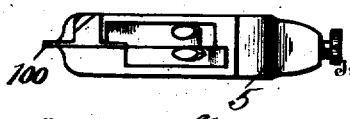

In the aforesaid drawings, Figure 1 is a perspective view of a sewing machine constructed in accordance with our invention, but with parts broken away in order to better illustrate the same; Fig. 2 is a top plan of the machine with the work support and the arm carrying the needles and presser foot removed; Fig. 3 is a vertical transverse section; Fig. 4 is a detail of the movable knife and its supporting members; Fig. 5 is a similar view of the same parts shown in Fig. 4, illustrated in connection with the cam for operating the same; Fig. 6 is a section through the main shaft, taken on a line immediately behind the section shown in Fig. 5; Fig. 7 is a perspective view of the movable knife and its connected parts detached; Fig. 8 is a perspective view of part of the main shaft and its cams; Fig. 9 is a side elevation of the parts for making the cutting mechanism ineffective and for regulating the cutting of different thicknesses of fabric. Fig. 10 is a perspective view of the parts shown in Fig. 9, detached; Figs. 11 and 12 are side elevation and bottom plan views, respectively, of the presser foot; Figs. 13 and 14 are respectively top plan and sectional views of the throat plate; and Fig. 15 is a sectional detail.

Referring now to the details of the drawings by numerals, 1 indicates the bed plate or work support of a sewing machine, which, in the form illustrated in the drawings, is an ordinary twin needle over stitching machine, and therefore has the usual twin needles 2 and 3. These needles in operation work through the two needle openings in the presser foot 5 and through two similar openings in the throat plate 9, all of which, except as hereinafter noted, may be of the ordinary construction. It may be here stated, however, that our invention is capable of use on other than twin needle machines, and parts may be used in connection with machines that do not do overstitching, and it will be obvious that the cutting mechanism may be used independent of any stitching mechanism. Reference should, therefore, be made to the appended claims to ascertain the scope of the invention.

The throat plate 9 is made of the construction shown in detail in Figs. 13 and 14, and as this throat plate is one of the most necessary parts of the machine, it will be described first. Said plate is of ordinary form in that it is provided with the usual openings 10 for the needles, and also with the ordinary openings 11 for the feed dogs 13, hereinafter described. The throat plate 9 is also provided with a large opening 15, which is located between the feed dog openings 11 and forward of the needle openings. This large opening 15 has a fixed knife 14 projecting slightly through it, and the movable knife 16 and part of the throwout mechanism, both of which will be hereinafter further described in detail, also work through the same openings 15. The said movable knife 16 acts against the fixed knife 14 in order to shear off a portion of the goods which is fed between them, as will be hereinafter described, and the throat plate is also formed with a ridge or wall 18, which is immediately forward of one of the needle openings 10, so as to deflect a part of the severed material, in order that it cannot be reached by the needles, and, therefore, cannot be stitched.

Having given a general description of the throat plate and its coöperating parts, we will now describe the mechanism underneath said throat plate and the various movements thereof. It may here be mentioned that the machine is the well known "Union Special" type, and comprises a main shaft running the whole width of the machine, from which single shaft 20 all the various mechanisms and parts are operated. Not only are all the parts under the work support 1 operated by or from this single main shaft 20, but the needle lever 22 is also operated therefrom through the medium of the eccentric 23, shown at the right hand end of the machine, as seen in Fig. 1. The aforesaid main shaft 20 has several cams secured to it, one of them, 24, being illustrated best in Fig. 8, and, as there shown, this cam operates a rocking fork 26 for the purpose of giving the looper 28 its needle-avoiding movement. This looper 28 is of ordinary form and has connected with it the looper guard finger 29, (see Fig. 3,) both of which are connected to and carried by a looper-rocker 30. This rocker 30 is given a compound movement as it is rocked, owing to the fact that its cranked arm 31 is connected to the shaft 32, to which the rocking fork 26 is secured, and the forward end or stud 33 of the rocker 30 is connected, by means of a pitman 34, with the lower end 35 of the needle lever 22. All of these parts are common in the art, and may be found, for example, in United States Patent No. 765,120, and, therefore, need no further description except to state that when the lower end of the needle lever 22 is reciprocated back and forth the looper 28 is given a similar back and forth movement, owing to the connection formed by the pitman 34 with the lower end 35 of the needle lever 22, and at the same time the cam 24, Fig. 8, is so formed that at the beginning and end of this movement of the looper caused by the pitman 34 the looper is given its needle-avoiding movement owing to its connection, through the cranked arm 31, the shaft 32, and the rocking fork 26, with the cam 24. The feed dogs may also be of the common or any desired form, and, as illustrated, are indicated by the numeral 35 and are mounted on an arm or lever 36, the forward end of which rests on a cam 37, as indicated in Fig. 3, and its rear end extends back and is pivotally supported on a shaft 38, supported in a rocking frame 39, which is capable of rocking on a bar or shaft 40, supported in bearings 42, forming part of the bed 43 of the machine. The arm or lever 36, supporting the feed dogs 35, is acted upon by the aforesaid lifting cam 37, and said arm or lever also has secured to it a downwardly extending arm 44, projecting beneath the cam. It follows from this construction that as the lifting cam is rotated the feed dogs 35 are raised and lowered. It is, of course, necessary that the feed dogs have the usual backward and forward movements in addition to the upward and downward movements, so as to partake of the necessary four motion movement, and to accomplish this we secure to the end of the main shaft 20 a radially adjustable wrist or crank pin 46, (see Figs. 1, 2 and 8,) and this pin is connected, by means of a freely pivoted link 48, with a curved arm 49, projecting from the rocking frame 39. It is evident from this construction that as the main shaft 20 rotates the rocking frame 39 is given a rocking movement on the bar or shaft 40, owing to the connections consisting of the wrist pin 46, the link 48, and the curved arm 49, just described. All of these parts, as hereinbefore stated, may be of the ordinary construction, and, in fact, those illustrated are substantially like the corresponding parts found in United States Patent No. 470,092, and are, therefore, well known and need no further description.

We have hereinbefore referred to a movable knife as acting through one of the openings in the throat plate 9, and we will now describe the mechanism for giving this movable knife its cutting movements and the means by which the position of the knife may be changed or adjusted relatively to the fixed knife 14. By reference particularly to Figs. 5, 6, 7 and 8, it will be observed that the said movable knife 16 projects from a knife plate 53, which is screwed to the knife carrier 54. Before describing this knife carrier 54 it will be well to state that the knife 16 is provided with a piercing point of the character disclosed in our aforesaid patent, so that said knife will pierce the fold and enter between the plies of material fed through the machine. This carrier 54 has an arm 55 projecting downwardly therefrom at the front end thereof, and this arm has a boss 56 formed in the lower end, in which is located a spindle 57. This spindle 57 is formed in a peculiar way, in that one of its ends 58 is formed eccentric to the main portion 57. The eccentric portion 58 projects into a slot 60, formed in the forward end of the member 44, projecting from the arm or lever 36, which carries the feed dogs. It, therefore, follows that as the cam 37 causes the parts 36 and 44 to move up and down to raise and lower the feed dogs the knife 16 is likewise raised and lowered as the forward end of the knife carrier 54 is supported through the spindle 57 and 58 on the part 44. The reason for forming one part of the spindle 57, 58, eccentric to the other portion is to enable the movable knife 16 to be adjusted with respect to the fixed knife 14. It will, of course, be understood that it is desirable to have the knives 14 and 16 adjustable, in order to take up wear, or so that they may be moved closer together or farther apart to make it possible to cut thin summer goods or to cut thicker goods for winter wear. The spindle 57, 58, is, therefore, formed with one end eccentric to the other, so that it may be adjusted or moved, and as the position of the movable knife is determined by the position at which the spindle 57, 58, is supported, it follows that the mere movement of this spindle raises or lowers the movable knife. In order to make it easier to move or adjust the spindle, we insert a pin 61 through it, and a set screw 62 is employed to hold the spindle in position when once adjusted. In Fig. 4, one position of the knife and its eccentric adjusting spindle is shown in full lines, and the other position in dotted lines. In order to obtain the best results, this movable knife 16, in addition to receiving its upward and downward movement, also receives a forward and backward movement. In order to permit of this backward and forward movement, the knife carrier 54 is supported at its rear end by means of a link 63, which is pivotally connected to said knife carrier and which projects from a sleeve 64, (see Fig. 7,) located on the rod 40, hereinbefore referred to. This connection permits the knife carrier and its knife 16 to be moved back and forth; but to positively cause this movement we employ the following mechanism: On the main shaft 20 we secure a second cam or eccentric 67, (see Figs. 6 and 8,) which is alongside of the cam 37, hereinbefore mentioned as raising and lowering the lever carrying the feed dogs. This eccentric 67 is located with an eccentric strap 68 projecting from an arm 70, which is pivotally connected with a curved arm 71, projecting from the aforesaid sleeve 64. Hence as the shaft 20 rotates the eccentric 67 operates the arm 70, which, through the curved arm 71, rocks the sleeve 64, and this rocking movement is imparted to the link 63, which thus moves the knife carrier 54 back and forth. We wish to direct particular attention to the fact that the cam 37 and the eccentric 67 work in opposition to each other, as will be seen in Fig. 8. In other words, the larger part of the cam 37 projects from the opposite side of the shaft 20, from which the larger part of the eccentric 67 projects. This construction, of course, causes the feed dogs to move in one direction, while the knife is moved in the opposite direction. As will be seen from an inspection of Fig. 2, the movable knife 16 as it moves backward and forward and up and down, as hereinbefore described, coacts with the fixed knife 14 in such a manner that any material that is fed between them is cut by the shear-like movements given to the movable knife. In order that the movable knife may be held in proper cutting contact against the fixed knife, we connect the knife carrier 54 to a part of the frame 59 by means of a spring 72. This connection is shown in Fig. 2. It must not be understood from this that the knife carrier 54 is loosely supported; but the spring is provided in order to take up the slight looseness that may exist in the pivots of the knife carrier, and thus insure the proper cutting contact.

In order to make it possible to throw the cutting mechanism out of action, in order that the machine may be used even temporarily to perform the operation of stitching only, we make use of the following parts. The fixed knife 14 (see Figs. 9 and 10) instead of being secured directly to the bed or even to the throat plate is secured, by means of a screw 73, to a bracket 75, which latter is screwed directly to the vertical wall 76, projecting downward from the work support. (See Figs. 1 and 3.) The rear portion of the fixed knife is formed with a slot 78, through which the screw 73 projects, and this slot permits an adjustment of the fixed knife when such adjustment is necessary. The bracket 75, where the screw 73 finds its entrance, is formed with a projecting boss 79, and this boss forms a support for a lever 80, which projects downward therefrom, as seen in Figs. 9 and 10. Working between the bracket 75 and this lever 80 is a plate 81, which is formed with two slots 82 and 83, through which project screws or pins 84 and 85, which permit the plate to be moved back and forth on the screws or pins to the limit of the slots 82 and 83. The lever is connected to this plate 81, by means of a screw or bolt 87, so that whenever the lever is moved the plate is also moved, the movement, of course, being guided by the slots and pins just referred to. At the lower end of the bracket 75 we form a projection 89, and the lower end of the lever 80 is formed to engage this projection. In order to hold the lever on one side or the other of the projection and yet permit easy movement of the lever when necessary, we interpose a spring 90 between the head of the screw 87 and the lever 80, and yet to permit the lever to be more easily moved we form a handle 91 on the lower end of the lever. The upper end of the plate 81 is provided with a curved finger 94, which is located directly alongside of the fixed knife 14, as indicated in Fig. 9, and from an inspection of this figure, it is evident that when the operator moves the handle 91 the lever is moved to throw the plate 81 to the limit of its movement on the screws 84 and 85, which necessarily causes the finger 94 to be projected upward so that it is above the knife 14 and the piercing point of the knife 16, as indicated in dotted lines in Fig. 9. This finger when in this position is just high enough (see Fig. 15) to enable the goods to ride on the finger without coming in contact with or being cut by either of the knives 14 and 16. In order to control the movement of the finger 94, we form a projection 96 on the bottom of the bracket 75, and in this projection we insert a set screw 97, provided with a nut lock 98 for holding the screw in any certain position. This screw projects into the path of the end of the lever 80, and the adjustment of the screw 97 enables us to give intermediate adjustment to the finger 94, thus regulating the depth of cutting of the various thicknesses of fabric. In one position the finger prevents the fabric from being cut, and in the position shown in full lines in Fig. 9, the projection 94 is depressed for cutting thin fabrics, and when the screw 97 is adjusted to permit the plate 80 to be moved to the position shown in dotted lines on the left hand side of Fig. 9, the finger 94 is entirely out of the path of the knives, thereby allowing full cutting capacity.

The operation of our machine is as follows: When it is desired to make simple necking for underwear, two thicknesses of material are fed to the machine with the fold of the material entering under the presser foot. As the material is fed by the feed dogs the fold is moved against the piercing point of the movable knife 16, and as this point moves in the opposite direction to that in which the material is fed, the fold is quickly pierced in such a way that one thickness rides over the piercing point of the knife, and the other thickness is between said knife and the fixed knife 14. As the said shaft continues its rotation, the movable knife is caused to have a downward movement, engaging the fixed knife, and thus severing the material. During the time the knife is moving backward and the feed dogs are moving forward so as to be placed in the proper position to again feed and cut the material, the needles are entering the fabric and the overstitching is being performed in a manner well understood to those familiar with this class of machine. After the stitch is formed and the needles move upward free from the work, the cams are in just the position to again feed forward the material, and then the knife cuts as before. In order to make it impossible to sew the strip that has been cut off, the ridge 18, hereinbefore referred to, is so located that the strip is guided out of the path of the needles, and thus cannot be sewed.

When ordinary necking is being formed, we employ a presser foot somewhat like that shown in our hereinbefore mentioned patent; but when it is desirable to sew collarettes onto a shirt we employ a presser foot like that shown in perspective view in Fig. 1, and in side elevation and bottom plan in Figs. 11 and 12. From these figures, it will be observed that the foot 5 is provided with a vertical dividing wall 100, and projecting from the lower end of this wall is a flange or rest 101, this flange being free on all but one of its sides from the dividing wall 10. In other words, there is a passage 102 at the rear end of the flange 101, so that any material which may be fed over the flange may pass under the foot proper. This construction is to simplify the operation when sewing collarettes onto a shirt and to enable the operator to guide the upper fold of the collarette in the path of the needle, the folded part of the collarette passing over the flange or ledge 101, so that it does not come in contact with the knives, yet the passage 102 permits the strip to again enter under the presser foot, so that it may be sewed to the material passed under the flange or ledge 101, and which is, therefore, both cut and stitched.

In the foregoing description and in our drawings, we have illustrated what we now consider the preferable embodiment of our invention, and it is manifest that changes may be made without departing from the same. For instance, it is evident that it is possible to apply our invention to a single needle machine, and, of course, it is not our intention to limit our claims to any form of machine, as the cutting mechanism may be used irrespective of sewing machines.

It will also be seen that instead of providing a separate fixed knife 14, the movable knife may operate against part of the machine—such, for example, as against part of the throat plate. This and other changes may be made, and reference should, therefore, be made to the appended claims to determine the scope of the invention.

Having thus described our invention, what we claim as new and desire to secure by Letters Patent, is:—

1. In a sewing machine and in combination with the stitching mechanism thereof, feeding mechanism and cutting mechanism, the latter comprising a fixed blade or knife, a movable cutter, and means for operating the movable cutter in a forward direction, the feeding mechanism moving backward in its feeding movement simultaneously with the forward cutting movement of said movable cutter; substantially as described.

2. In a sewing machine and in combination with the stitching mechanism thereof, feeding mechanism and cutting mechanism, the latter comprising a fixed blade or knife, a movable cutter and means for operating the movable cutter in a forward direction, the said feeding mechanism moving backward in its feeding movement simultaneously with the forward cutting movement of said movable cutter, and said movable cutter receiving part of its motion from said feeding mechanism; substantially as described.

3. In a sewing machine and in combination with the stitching mechanism thereof, feeding mechanism and cutting mechanism, the latter comprising a fixed blade or knife, a movable cutter, and means for operating the movable cutter in a forward direction, the feeding mechanism moving backward in its feeding movement simultaneously with the forward cutting movement of said movable cutter, and means for yieldingly holding the movable cutter in position; substantially as described.

4. In a sewing machine and in combination with the stitching mechanism thereof, a feed dog, mechanism for giving said dog a backward and forward movement and an up and down movement, a cutting member coacting with said feed dog and means for moving said cutting member backward and forward in opposition to the movement of said feed dog, said cutting member also receiving an up and down movement from the feed dog; substantially as described.

5. In a sewing machine and in combination with the stitching mechanism thereof, feed mechanism comprising a feed dog, mechanism for giving said dog a backward and forward movement and an up and down movement, a cutting member coacting with said feed dog, and means for moving said cutting member backward and forward in opposition to the movement of said feed dog, the said cutting member being yieldingly held in position and also receiving an up and down movement from the feed mechanism; substantially as described.

6. In a sewing machine and in combination with the stitching mechanism thereof, a main shaft, a feed dog, a cam on said main shaft imparting an up and down movement to said feed dog, a cutting member provided with a piercing point and having a connection with said feed dog for moving the cutter up and down, and means for giving said cutting member a horizontal movement; substantially as described.

7. In a sewing machine and in combination with the stitching mechanism thereof, a main shaft, a lever or arm carrying a feed dog, connections between said shaft and said lever or arm for moving the same up and down and backward and forward, and a cutting member provided with a piercing point and having a forward movement to pierce the folded fabric, and means for giving said cutting member a downward movement to cut the lower ply of said fabric; substantially as described.

8. In a sewing machine and in combination with the stitching mechanism thereof, a main shaft having a cam thereon, a lever or arm coacting with said cam and receiving an up and down movement therefrom, a feed dog supported on said lever or arm, a connection between said shaft and said lever or arm for moving the latter, and its feed dog backward and forward, and a cutting member with a piercing point having a forward piercing movement, the feed dog moving backward in its feeding movement simultaneously with the forward piercing movement of said cutting member; substantially as described.

9. In a sewing machine and in combination with the stitching mechanism thereof, a shaft, a lever or arm carrying a feed dog, connections between said shaft and said lever or arm for moving the same up and down and backward and forward, a cutting member having a connection with said lever or arm and movable up and down thereby, and a cam carried by said shaft for giving said cutting member a backward and forward movement; substantially as described.

10. In a sewing machine and in combination with the stitching mechanism thereof, a shaft, a lever or arm carrying a feed dog, a cam on said shaft for giving said feed dog movement up and down, a cutting member having a connection with said lever or arm and movable up and down thereby, means on said shaft for giving said feed dog a backward and forward movement, and means on the shaft for giving the knife a backward and forward movement; substantially as described.

11. In a sewing machine and in combination with the stitching mechanism thereof, a shaft, a lever or arm carrying a feed dog, a cam on said shaft for giving said feed dog movement up and down, a cutting member having a connection with said lever or arm and movable thereby, means on said shaft for giving said feed dog a backward and forward movement, and means on the shaft for giving the knife a backward and forward movement, said movements being in opposite directions; substantially as described.

12. In a sewing machine and in combination with the stitching mechanism thereof, a shaft, a lever or arm carrying a feed dog, a knife and knife carrier, a cam on said shaft for giving said feed dog and said knife and knife-carrier their vertical movements, and a cam on the shaft for giving said knife its horizontal movement; substantially as described.

13. In a sewing machine and in combination with the stitching mechanism thereof, a shaft, a feed dog, a lever or arm carrying said feed dog and movable by said shaft, and a knife having a connection with said lever or arm and receiving vertical motion only therefrom, said connection being adjustable whereby the position of said knife may be changed for cutting different thicknesses of material and means for giving said knife a horizontal movement; substantially as described.

14. In a sewing machine and in combination with the stitching mechanism thereof, a shaft, a lever or arm carrying a feed dog, and movable by said shaft, a knife, and an eccentric connecting said knife with said lever or arm, whereby the position of the knife may be changed; substantially as described.

15. In a sewing machine and in combination with the stitching mechanism thereof, a shaft, a lever or arm carrying a feed dog, means on said shaft for giving said feed dog movement, a knife carrier and its knife, means for giving movement to said knife carrier, and an adjustable eccentric connecting said knife carrier with the means for giving it movement whereby the position of the knife may be adjusted; substantially as described.

16. In a sewing machine and in combination with the stitching mechanism thereof, a shaft, a lever or arm carrying a feed dog, a cam on said shaft for giving said lever or arm and its dog an up and down movement, a connection for giving said lever or arm and its dog a backward and forward movement, a knife carrier and its knife and an eccentric connecting said knife carrier and said lever or arm, whereby the knife carrier is moved by said lever or arm and its position is adjustable by said eccentric; substantially as described.

17. In a sewing machine and in combination with the stitching mechanism thereof, a shaft, a lever or arm carrying a feed dog, a cam for giving an up and down movement to said lever or arm, a connection for giving a backward and forward movement to said lever or arm, a knife carrier and its knife, a connection for giving the knife carrier a backward and forward movement, and an eccentric connecting said knife carrier and the lever or arm, whereby said knife carrier is moved by the lever or arm and is adjustable by means of its eccentric; substantially as described.

18. A cutting mechanism including in combination, a work support, feeding mechanism, a cutting device, means for moving said cutting device to sever the material, and means located in advance of the cutting device in the direction of the feed, and operating upon the material for diverting the material out of the path of the cutting device, whereby the cutting action of said cutting device is rendered ineffective.

19. A cutting mechanism including in combination, a work support, feeding mechanism, a cutting device, means for operating said cutting device to sever the material, and a device adapted to engage the under face of the material in advance of the cutting device, whereby said material may be diverted out of the path of the cutting device, and means for raising and lowering said device engaging the under face of the material relative to the work support.

20. A cutting mechanism including in combination, a work support, a feeding mechanism, a cutting device, means for moving said cutting device to sever the material, a member operating upon the material in advance of the cutting device, and movable relative to the work support for adjusting the plane in which the material moves relative to the cutting device.

21. A cutting device including in combination, a work support, feeding mechanism, and a cutting mechanism, and means located in advance of the cutting mechanism operating upon the material for diverting the material out of the path of said cutting mechanism, whereby the cutting action of said cutting mechanism is rendered ineffective.

22. A cutting device, including in combination, a work support, feeding mechanism, a cutting mechanism and means for operating said cutting mechanism, a device engaging the under face of the material passing over the work support, and means for raising and lowering said device relative to the work support.

23. A cutting device including in combination, a work support, a feeding mechanism, a cutting mechanism and means for operating said cutting mechanism, and means movable relatively to the work support and operating upon the material for adjusting the plane in which the material moves.

24. A cutting device including in combination, a work support, a feeding mechanism and a cutting mechanism, including a blade entering between and separating layers of material, and means operating upon the material for adjusting the plane in which said material moves.

25. A cutting device including in combination, a work support, a feeding mechanism, and a cutting mechanism including a blade entering between and separating layers of material, a device for engaging the under face of the material passing over the work support, and means for raising and lowering said device.

26. A cutting device including in combination, a feeding mechanism, a cutting mechanism comprising a blade adapted to enter between and separate superposed layers of fabric, and a device for raising and lowering the material in front of said blade.

27. A cutting device including in combination, a feeding mechanism, a cutting mechanism comprising a blade adapted to enter between and separate superposed layers of fabric, a device for raising and lowering the material in front of said blade, and means for limiting the movement of said device.

28. The combination with a work support and feeding mechanism for feeding the material across the work support, a cutting mechanism including a blade, and a coöperating movable cutter, and means operating upon the material and independent of the cutting mechanism for making said cutter ineffective.

29. The combination with a work support and feeding mechanism, for feeding the material across the work support, of a cutting mechanism including a blade and a coöperating movable cutter for entering between and separating superposed layers of fabric, and means independent of the cutting mechanism, for making said cutter ineffective.

30. The combination with a work support and feeding mechanism for feeding the material across the work support, of a cutting mechanism including coöperating cutting members adapted to sever the material, and means for rendering said cutting mechanism ineffective, comprising a member arranged to be thrown into juxtaposition to the cutting members in advance thereof in the direction of the feed, whereby the material is diverted out of the path of the cutting mechanism.

31. A cutting mechanism including in combination, a work support, a feeding mechanism and a cutting device, means for moving said cutting device to sever the material and a finger normally located below said cutting device and in advance thereof, and movable into juxtaposition to said cutting device, whereby the plane of movement of the material relative to the cutting device may be varied, and means for holding said finger in its adjusted positions.

32. A cutting mechanism including in combination, a work support, feeding mechanism, a cutting device, means for moving said cutting device to sever the material, and means independent of the cutting device located in advance thereof in the direction of feed and operating upon the material for rendering the cutting action of said cutting device ineffective.

33. The combination with a work support and feeding mechanism, for feeding the material across the work support, of a cutting mechanism including a member relatively movable with respect to the work support, and means for rendering the same ineffective, said means comprising a member arranged to be thrown into juxtaposition to the cutting edge of said cutter in advance thereof to allow material to pass over said cutter.

34. The combination with a work support and feeding mechanism, of a cutting mechanism comprising a cutter, a finger normally located below said cutter and in advance thereof, and movable in juxtaposition to the cutting edge of said cutter to allow material to pass over said cutter, and means for holding said finger in position; substantially as described.

35. A cutting mechanism, including in combination, a work support, a feeding mechanism, a cutting device, means for operating the cutting device, and means in advance of and independent of the cutting mechanism and operating upon the material for rendering its cutting action ineffective; substantially as described.

36. A cutting mechanism including in combination a work support, a presser foot, a feeding mechanism for feeding two or more plies of fabric beneath the presser foot, a cutting device including a separating and cutting member adapted to enter between said layers of fabric to support one of said layers, and to cut said other layer, and means independent of the cutting device for rendering its cutting action ineffective; substantially as described.

37. A cutting device including in combination, a work support, feeding mechanism and means for separating superposed layers of fabric and cutting one of said layers and including a member moving substantially at right angles to the work support, and means operating upon the material for rendering the cutting action ineffective during the continued operation of the feeding mechanism.

38. In a sewing machine, in combination with stitch-forming mechanism, a cutting device including means for separating superposed layers of fabric and cutting one of said layers and including a member moving substantially at right angles to the work support, and means operating upon the material for rendering the cutting device ineffective.

39. In a sewing machine, the combination with a work support, stitch-forming mechanism, a feeding mechanism and a cutting mechanism including a cutting device having a point adapted to penetrate a folded fabric, and separate superposed layers of fabric and cut one of said layers, means for actuating said cutting device, and means for rendering the cutting device ineffective.

40. A cutting device including in combination cutting members, means for causing them to coöperate to perform the severing action, and means for rendering the cutting action ineffective during the continued movement of the cutting device, said means being located in advance of the cutter in the line of feed operating upon the material, and being independent of the cutting mechanism.

41. In a sewing machine and in combination with the stitching mechanism thereof, cutting mechanism comprising a blade and a movable cutter, and means independent of the cutting mechanism and operating upon the material for making said cutter ineffective; substantially as described.

42. In a sewing machine and in combination with the stitching mechanism thereof, a cutter, and means for making said cutter ineffective, comprising a member arranged to be thrown in juxtaposition to the cutting edge of said cutter to allow material to pass over said cutter; substantially as described.

43. In a sewing machine and in combination with the stitching mechanism thereof, cutting mechanism comprising a cutter, a finger normally located below said cutter, and movable in juxtaposition to the cutting edge of said cutter to allow material to pass over said cutter, and means for holding said finger in either of its positions; substantially as described.

44. In a sewing machine and in combination with the stitching mechanism thereof, cutting mechanism comprising a cutter, a finger normally located below said cutter and movable into position to allow material to pass over said cutter, a lever for moving said finger, and means for holding said lever in position; substantially as described.

45. In a sewing machine and in combination with the stitching mechanism thereof, cutting mechanism comprising a cutter, a finger normally located below said cutter, a lever for moving said finger into position to allow material to pass over said cutter, and means for holding said lever in either of its positions and for adjusting said lever and its finger; substantially as described.

46. In a sewing machine and in combination with the stitching mechanism thereof, cutting mechanism comprising a cutter, a finger normally located below said cutter, and movable into position to allow material to pass over said cutter, a lever for moving said finger, means for holding said lever in either of its positions, and a screw for changing the limit of movement of said lever; substantially as described.

47. In a sewing machine and in combination with cutting and stitching mechanisms thereof, said cutting mechanism being located in advance of said stitching mechanism, a presser foot co-acting with said cutting mechanism and having a vertical guiding wall projecting from its lower side and a ledge or flange projecting therefrom, whereby one layer may be guided and fed under the ledge or flange; substantially as described.

48. In a sewing machine and in combination with cutting and stitching mechanisms thereof, said cutting mechanism being located in advance of said stitching mechanism, a presser foot coacting with said cutting mechanism and having a vertical wall acting as a guide for a strip of material, and a ledge or flange projecting laterally from said vertical wall, said ledge or flange having a passage between it and the foot proper; substantially as described.

49. In a sewing machine and in combination with the stitching mechanism thereof, feeding mechanism, and cutting mechanism comprising a fixed blade and a movable cutter, the latter projecting forward over the cloth plate and having both forward and downward movements, the feeding mechanism moving backward in its feeding movement simultaneously with the forward cutting movement of said movable cutter; substantially as described.

50. In a sewing machine and in combination with the stitching mechanism thereof, cutting mechanism comprising a blade having a piercing point, said blade having a forward movement to pierce a folded fabric and a downward movement to cut the lower ply of said fabric; substantially as described.

In witness whereof, we hereunto affix our signatures, in the presence of two witnesses.

BERNARD H. ZIMMERMAN.
ROBERT HUGHES, Jr.

Witnesses as to the signature of Bernard H. Zimmerman:

Stephen I. Dale,
Edmund H. Wells.

Witnesses as to the signature of Robert Hughes, Jr.:

P. K. Keman,
Geo. A. Keman.